United States Patent
Young

(10) Patent No.: US 10,751,558 B2
(45) Date of Patent: Aug. 25, 2020

(54) UNIVERSAL NOZZLE CONNECTOR WITH AN ADJUSTABLE MOUNT

(71) Applicant: Performance Advantage Company, Inc., Lancaster, NY (US)

(72) Inventor: Richard E. Young, Lancaster, NY (US)

(73) Assignee: Performance Advantage Company, Inc., Lancaster, NY (US)

( * ) Notice: Subject to any disclaimer, the term of this patent is extended or adjusted under 35 U.S.C. 154(b) by 0 days.

(21) Appl. No.: 15/991,151

(22) Filed: May 29, 2018

(65) Prior Publication Data

US 2018/0272168 A1   Sep. 27, 2018

Related U.S. Application Data

(63) Continuation of application No. 14/598,663, filed on Jan. 16, 2015, now abandoned.

(Continued)

(51) Int. Cl.
  *A62C 31/28* (2006.01)
  *F16L 23/06* (2006.01)
  (Continued)

(52) U.S. Cl.
  CPC .............. *A62C 31/28* (2013.01); *A62C 31/24* (2013.01); *F16L 3/233* (2013.01); *F16L 23/06* (2013.01);
  (Continued)

(58) Field of Classification Search
  CPC ... B05B 15/061; B05B 15/064; B05B 7/1481; F16L 3/1033; F16L 3/1041; F16L 3/13; F16L 3/24; F16L 3/00; F16L 3/08; F16L 3/1083; F16L 3/221; F16L 3/127; F16L 3/1066; F16L 3/233; F16L 3/14; F16L 3/137; F16L 23/06; F16L 33/12;
  (Continued)

(56) References Cited

U.S. PATENT DOCUMENTS 196,807 A * 11/1877 Jolliffe .................... F16L 23/06
                                                                285/409
455,967 A *  7/1891 Lusk et al. ............. F16L 33/12
                                                                 24/271

(Continued)

FOREIGN PATENT DOCUMENTS

DE     10258828 A1   7/2004
WO   2006043738 A1   4/2006

OTHER PUBLICATIONS

U.S. Statutory Invention Registration No. H1012, Published Jan. 7, 1992 (Senatro).

*Primary Examiner* — Hiwot E Tefera
*Assistant Examiner* — Taylor L Morris
(74) *Attorney, Agent, or Firm* — Simpson & Simpson, PLLC; Michael Nicholas Vranjes

(57) ABSTRACT

An adjustable locking assembly, including a strap lock including a clamping element, a locking strap including a first end connected to the strap lock and a second end connected to a locking pin, and a pin locking element including a pivoting latch, the pivoting latch including a channel arranged to receive the locking pin, wherein in a locked position, the locking pin is secured in the channel and the pivoting latch is pivoted away from the strap lock, and in an unlocked position, the locking strap is freely movable.

15 Claims, 9 Drawing Sheets

Related U.S. Application Data

(60) Provisional application No. 61/936,615, filed on Feb. 6, 2014.

(51) Int. Cl.
| | |
|---|---|
| *F16L 3/233* | (2006.01) |
| *A62C 31/24* | (2006.01) |
| *F16B 2/08* | (2006.01) |
| *F16L 3/24* | (2006.01) |
| *F16B 21/02* | (2006.01) |
| *F16L 33/12* | (2006.01) |
| *F16L 3/10* | (2006.01) |
| *F16L 3/127* | (2006.01) |
| *A62C 35/68* | (2006.01) |

(52) U.S. Cl.
CPC ............... *A62C 35/68* (2013.01); *F16B 2/08* (2013.01); *F16B 21/02* (2013.01); *F16L 3/1033* (2013.01); *F16L 3/127* (2013.01); *F16L 3/243* (2019.08); *F16L 33/12* (2013.01)

(58) Field of Classification Search
CPC ......... F16L 3/1008; F16L 3/22; F16L 33/035; H02G 3/32; F16B 2/08; F16B 21/02; A62C 31/28; A62C 35/68; A62C 31/24
USPC ........ 248/70, 73, 74.1, 74.2, 75, 80, 222.12, 248/62, 67.7, 74.5; 24/273
See application file for complete search history.

(56) References Cited

U.S. PATENT DOCUMENTS

| | | | | |
|---|---|---|---|---|
| 624,671 | A | | 5/1899 | O'Brien |
| 649,165 | A | * | 5/1900 | Gordon ................. A62C 31/28 248/76 |
| 673,061 | A | * | 4/1901 | Prentice ................. A62C 31/28 248/76 |
| 1,451,006 | A | * | 4/1923 | Blaw ...................... A62C 31/28 248/84 |
| 1,667,342 | A | * | 4/1928 | Blaw ...................... A62C 31/28 248/84 |
| 1,971,438 | A | * | 8/1934 | Yoder .................... F16L 33/12 16/DIG. 33 |
| 2,273,571 | A | * | 2/1942 | Hafemeister .......... F16L 3/221 248/62 |
| 2,345,279 | A | * | 3/1944 | Morehouse ............. F16L 3/14 174/135 |
| 2,397,279 | A | | 3/1946 | Vesconte |
| 2,426,708 | A | * | 9/1947 | Robertson ............... F16L 3/14 248/74.3 |
| 2,542,679 | A | | 2/1951 | Kemnitz |
| 2,546,098 | A | * | 3/1951 | Houghton .............. F16L 33/12 24/271 |
| 2,550,001 | A | | 3/1951 | Button |
| 2,631,346 | A | | 3/1953 | Wengen et al. |
| 2,692,719 | A | * | 10/1954 | Maloney ................ A62C 31/28 182/51 |
| 2,746,064 | A | * | 5/1956 | Ausmus ................. A62C 31/28 7/127 |
| 2,768,418 | A | * | 10/1956 | Hoy ........................ F16L 33/12 24/20 CW |
| 2,929,597 | A | * | 3/1960 | Ruggieri ................ A62C 31/28 248/75 |
| 3,042,430 | A | * | 7/1962 | Guy ...................... F16L 23/06 24/270 |
| 3,226,069 | A | * | 12/1965 | Clarke ................... F16L 3/227 24/282 |
| 3,232,569 | A | | 2/1966 | Deardorf |
| 3,414,219 | A | | 12/1968 | Siegel |
| 3,417,951 | A | | 12/1968 | Rebentisch, Jr. |
| 3,805,988 | A | * | 4/1974 | Walker .................... B60P 3/32 220/23.89 |
| 3,894,707 | A | * | 7/1975 | Heard ...................... F16B 2/08 248/225.11 |
| 4,008,937 | A | * | 2/1977 | Filippi ................... F16L 23/06 174/78 |
| 4,066,233 | A | * | 1/1978 | Heard ...................... F16L 3/24 248/225.11 |
| 4,094,487 | A | * | 6/1978 | Heard ...................... G09F 7/18 248/230.9 |
| 4,122,587 | A | * | 10/1978 | Weiss ...................... A61B 6/04 128/876 |
| 4,125,240 | A | * | 11/1978 | Heard ...................... G09F 7/18 248/218.4 |
| 4,140,337 | A | | 2/1979 | Arcella et al. |
| 4,235,404 | A | * | 11/1980 | Kraus ..................... F16L 3/233 24/16 PB |
| 4,272,871 | A | * | 6/1981 | Weinhold ............... F16L 23/06 24/270 |
| 4,310,110 | A | * | 1/1982 | Dexter .................... A45F 3/08 224/246 |
| 4,314,389 | A | | 2/1982 | Sauer et al. |
| 4,391,376 | A | * | 7/1983 | Finnegan ............. A63C 11/028 211/70.5 |
| 4,395,784 | A | | 8/1983 | Foster |
| 4,510,650 | A | * | 4/1985 | Espinoza ................ F16L 3/233 24/16 PB |
| 4,526,333 | A | | 7/1985 | Nakama et al. |
| 4,619,545 | A | | 10/1986 | Kuttenbaum |
| 4,678,147 | A | * | 7/1987 | Barnes .................... F16L 3/22 24/279 |
| 4,687,234 | A | * | 8/1987 | Weinhold ............... F16L 33/12 24/270 |
| 4,927,103 | A | | 5/1990 | Nicholson |
| 4,955,573 | A | * | 9/1990 | Horvath ................. F24H 9/06 248/154 |
| 4,960,063 | A | | 10/1990 | Bontemps |
| 4,960,253 | A | * | 10/1990 | Perrault .................. F16L 3/22 248/68.1 |
| 5,024,404 | A | | 6/1991 | Ballard |
| 5,040,751 | A | * | 8/1991 | Holub ...................... F16L 3/11 248/62 |
| 5,042,114 | A | * | 8/1991 | Parrish ................... F16L 3/233 24/16 PB |
| 5,052,605 | A | * | 10/1991 | Johansson ............... B60R 9/10 224/324 |
| 5,069,310 | A | * | 12/1991 | Williams ................. E06C 9/04 182/100 |
| 5,098,054 | A | * | 3/1992 | Dyer ........................ F16B 2/08 248/225.11 |
| 5,136,757 | A | * | 8/1992 | Labonville ............. F16L 3/003 24/270 |
| 5,160,172 | A | | 11/1992 | Gariepy |
| 5,221,064 | A | * | 6/1993 | Hodges ................... F16L 3/133 248/333 |
| 5,346,165 | A | * | 9/1994 | Frean .................... F17C 13/084 248/146 |
| 5,380,052 | A | * | 1/1995 | Hendrickson ........... F16L 17/04 24/270 |
| 5,436,810 | A | * | 7/1995 | Sutherland ................ B62J 6/00 24/193 |
| 5,487,518 | A | * | 1/1996 | McCraney ................ F24H 9/06 248/225.11 |
| 5,577,701 | A | * | 11/1996 | Plzak ................... A47G 33/1226 248/524 |
| 5,598,995 | A | * | 2/1997 | Meuth ................... E21B 17/1035 24/273 |
| 5,632,457 | A | * | 5/1997 | Neely, Jr. ............... F16L 3/233 24/16 PB |
| 5,641,173 | A | | 6/1997 | Cobb, Jr. |
| 5,755,222 | A | * | 5/1998 | Pansard ................. F16L 33/035 128/204.26 |
| 5,842,615 | A | | 12/1998 | Goodness |
| 5,897,086 | A | | 4/1999 | Condon |
| 5,944,729 | A | | 8/1999 | Blake |
| 5,984,243 | A | | 11/1999 | Pfaller et al. |
| 6,059,252 | A | * | 5/2000 | Emmann ............... B60K 15/067 248/503 |

(56) References Cited

U.S. PATENT DOCUMENTS

| | | | |
|---|---|---|---|
| 6,124,935 A | 9/2000 | Matthews | |
| 6,234,277 B1 | 5/2001 | Kaczmarek | |
| 6,305,995 B1 | 10/2001 | Stauning et al. | |
| 6,364,262 B1 | 4/2002 | Gibson et al. | |
| 6,378,823 B1 * | 4/2002 | Edholm | B60K 15/067 180/68.5 |
| 6,402,198 B2 * | 6/2002 | Gollungberg | B60K 15/067 280/830 |
| 6,473,945 B1 * | 11/2002 | Draper | F16L 23/06 24/270 |
| 6,561,396 B2 * | 5/2003 | Ketterhagen | B60R 9/042 224/310 |
| 6,896,318 B2 * | 5/2005 | Marrs | B62D 27/02 280/833 |
| 6,932,303 B2 * | 8/2005 | Snyder | F16L 3/04 248/58 |
| 6,971,826 B2 * | 12/2005 | Valentine | B60P 7/12 410/104 |
| 6,994,300 B2 | 2/2006 | Labeirie et al. | |
| 7,114,686 B2 | 10/2006 | Andrigo | |
| 7,128,345 B2 | 10/2006 | Bartholomä et al. | |
| 7,261,256 B2 * | 8/2007 | Pattie | F16L 3/233 244/129.1 |
| 7,300,210 B2 * | 11/2007 | Johnson | F16C 35/063 384/537 |
| 7,402,074 B2 | 7/2008 | LeBlanc et al. | |
| 7,434,958 B2 | 10/2008 | Yang et al. | |
| 7,445,252 B2 * | 11/2008 | Ho | F16L 23/06 285/407 |
| 7,461,823 B2 * | 12/2008 | Decker | E04F 10/0644 248/230.8 |
| 7,516,922 B1 | 4/2009 | Kirschner | |
| 7,520,478 B2 | 4/2009 | Whitfield | |
| 7,540,071 B2 | 6/2009 | Sampson | |
| 7,546,986 B2 | 6/2009 | Kim | |
| 7,581,292 B2 | 9/2009 | Votel | |
| 7,621,487 B2 * | 11/2009 | Brown | F16L 3/24 248/65 |
| 7,861,981 B2 * | 1/2011 | Olver | F16L 3/137 24/16 PB |
| 7,926,766 B2 | 4/2011 | Tjerrild | |
| 7,931,310 B2 * | 4/2011 | Lake | F16L 17/025 285/111 |
| 3,020,895 A1 | 9/2011 | Reichmuth | |
| 8,132,764 B2 * | 3/2012 | Kuipers | B62J 6/02 24/273 |
| 8,177,146 B2 | 5/2012 | Chen | |
| 8,186,643 B2 * | 5/2012 | Luo | F16L 41/008 248/230.8 |
| 8,348,317 B1 | 1/2013 | Bird | |
| 8,398,040 B2 * | 3/2013 | Busch | A62B 9/04 248/230.1 |
| 8,413,933 B2 * | 4/2013 | Benne | F16L 3/11 248/62 |
| 8,534,614 B2 | 9/2013 | Guthke et al. | |
| 8,770,537 B2 | 7/2014 | Go | |
| 8,882,066 B2 * | 11/2014 | Otten | B65D 63/00 248/230.8 |
| 8,960,617 B2 * | 2/2015 | Karlsson | B60K 15/067 248/222.14 |
| 9,127,807 B1 * | 9/2015 | Holloway | F16M 13/022 |
| 9,303,792 B2 * | 4/2016 | Heims | H02G 3/32 |
| 9,447,899 B2 | 9/2016 | Minami | |
| 9,909,535 B2 * | 3/2018 | Sirosh | F02M 21/0221 |
| 10,022,574 B2 * | 7/2018 | McLoughlin | A62C 31/05 |
| 10,288,195 B2 * | 5/2019 | Crouzy | F16L 3/233 24/16 PB |
| 2006/0006648 A1 | 1/2006 | Grimmett et al. | |
| 2006/0131465 A1 * | 6/2006 | Lynch, Jr. | F16L 3/2235 248/68.1 |
| 2007/0040075 A1 | 2/2007 | Moretto | |
| 2007/0257159 A1 * | 11/2007 | Nelson | F16B 21/02 248/73 |
| 2009/0065659 A1 | 3/2009 | Dann | |
| 2009/0114784 A1 * | 5/2009 | Tam | B60K 15/067 248/205.1 |
| 2010/0219301 A1 | 9/2010 | Sampson | |
| 2012/0145839 A1 | 6/2012 | Runels et al. | |
| 2013/0256471 A1 | 10/2013 | Ruiz et al. | |
| 2016/0076430 A1 * | 3/2016 | Freeman | F01N 3/2066 60/301 |
| 2016/0082829 A1 * | 3/2016 | Hummel | F16B 2/08 248/315 |
| 2019/0014924 A1 * | 1/2019 | Penalver, Jr. | A47B 96/1441 |
| 2019/0092439 A1 * | 3/2019 | Stella | B63C 11/22 |

* cited by examiner

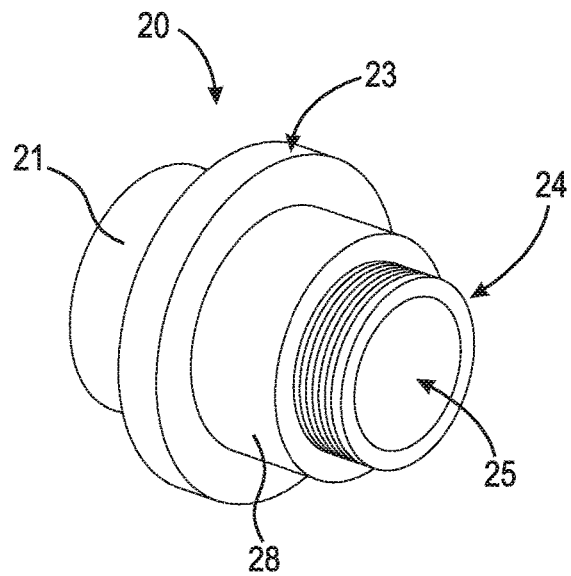
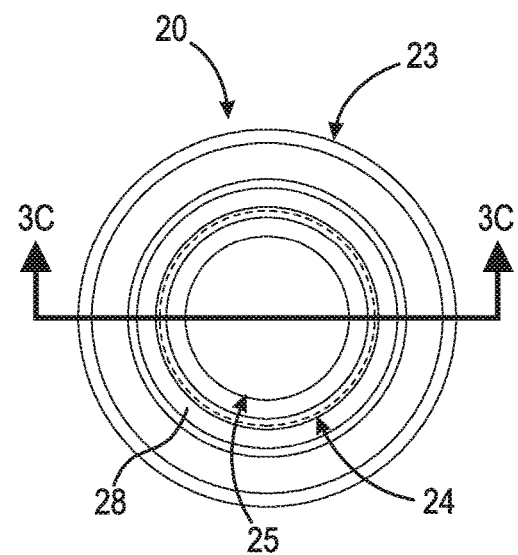
Fig. 3A  Fig. 3B
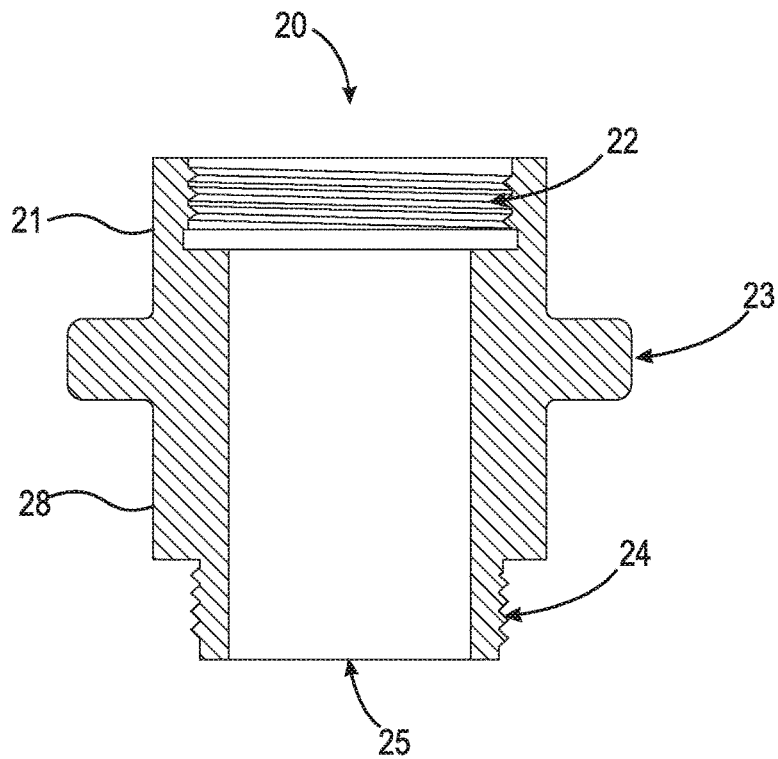
Fig. 3C

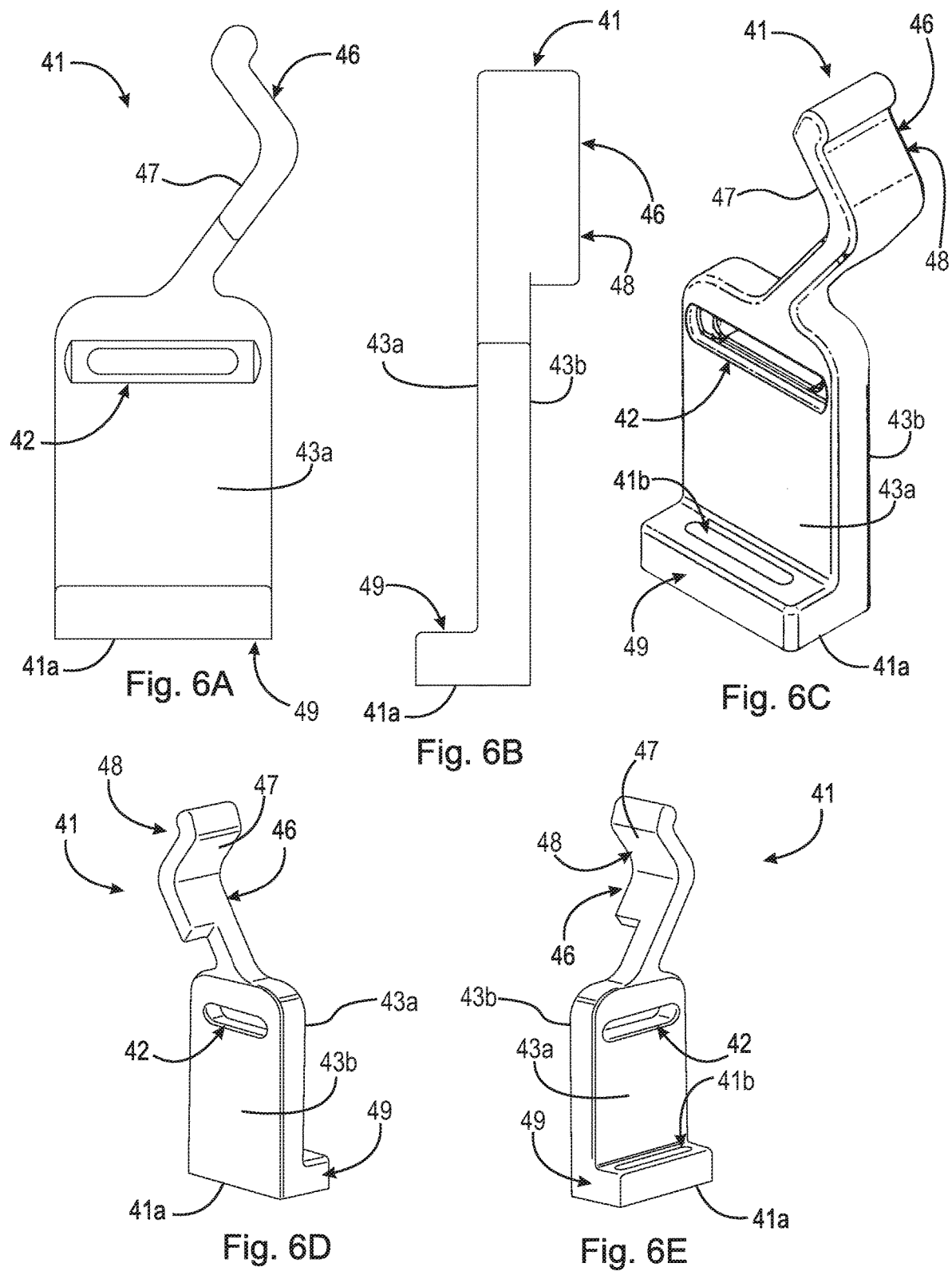

UNIVERSAL NOZZLE CONNECTOR WITH AN ADJUSTABLE MOUNT

CROSS-REFERENCE TO RELATED APPLICATIONS

This application is filed under 35 U.S.C. § 120 as a continuation patent application of U.S. patent application Ser. No. 14/598,663, filed on Jan. 16, 2015, which application claims the benefit under 35 U.S.C. § 119(e) of U.S. Provisional Patent Application No. 61/936,615, filed Feb. 6, 2014, which applications are incorporated herein by reference in their entireties.

FIELD

The present disclosure relates generally to an adjustable mounting system, and, more specifically, to an adjustable mounting system for a nozzle.

BACKGROUND

The most common firefighting nozzle has a 1.5" diameter nozzle in accordance with National Fire Protection Association (NFPA) Specifications. There are a number of manufacturers of 1.5" diameter nozzles. However, there are variances between nozzles from different manufacturers and thus there currently exists many different types of these nozzles. For example, some nozzles are very simple while some are very complex, and some are light in weight while others are quite heavy.

Fire trucks generally carry a number of different types of 1.5" nozzles. For example, some nozzles are pre-connected to a 1.5" hose that is pre-connected to the appropriate discharge. However, mounting pre-connected nozzles presents a significant challenge. A pre-connected nozzle ensures that a 1.5" hose is usually the first hose on the fire. The 1.5" pre-connect hose is usually a "cross lay hose bed" on top of the fire truck. In some cases, the 1.5" nozzle is carried in the hose bed. This could be located seven feet or more off the ground, thereby requiring a fire fighter to climb on the running board of the fire truck to reach the line. This can be dangerous, e.g., in bad weather conditions, resulting in falls.

Due to the popularity of 1.5" pre-connects, there are often multiple pre-connects. In order to minimize confusion, the control valves may have various color combinations on the pump panel with colored stripes on the fire hose that match the color for that hose on the pump control. The NFPA has described how these colors help to easily identify each pre-connect. However, it is often difficult and expensive to buy custom colored fire hose.

Some nozzles are not pre-connected, but are stored in an equipment compartment on tool boards or shelves, for example, while screwed into a screw plate which is a threaded male fitted base. The storage compartment is often congested and it may be difficult to mount nozzles either horizontally or vertically. There are also mounts that are "Tri Lock" spring action mounts in which three sets of teeth lock into the swivel female threads (internal threads) of the nozzle. Often, these sharp teeth can cause serious damage to the female threads causing significant and expensive damage. Mounting on a screw plate makes it difficult to turn the swivel by hand onto the screw plate, especially because it must be tightly screwed for it to be stable. Further, there commonly exists violent shaking of a truck on a rough road so stability is important.

A possible solution to this problem is disclosed in U.S. Pat. No. 8,020,895 (Reichmuth). Reichmuth discloses a pipe clamp and mounting structure that mounts a pipe to a fastening body. The device uses a holder which secures to the fastening body and a clamp that interlocks within the holder. The pipe that is mounted by the device has ribs corresponding to grooves cut into the holder which secure the pipe to the holder. The pipe can also be secured to the fastening body by resting in the holder and having the clamp lock around the pipe, fitting into a channel positioned between two ribs on the pipe. However, Reichmuth fails to disclose a mounting structure that can not only mount pipes, but be manipulated to secure other equipment such as boxes or cylindrical vessels. Additionally, Reichmuth fails to disclose a corresponding flexible mount module to further support the pipe that can be adjusted to accommodate a pipe with a larger or smaller diameter when compared to the size of the pipe secured within the mounting structure. Moreover, Reichmuth fails to disclose a strap that can be adjusted to have a greater tension if external forces act on the pipe and possibly cause the pipe to become unsecured.

Another possible solution to this problem is disclosed in U.S. Pat. No. 7,581,292 (Votel). Votel discloses a clip comprising opposed arms in mechanical communication with jaw members biased in a contacting relation. The jaw members are forced apart by a user applying opposing forces to each of the arms. The jaw members operably grasp the article when the arms are released. The clip has a structure for detachably interlocking with another clip. The clip may be made from a resilient material and includes a base structure defining an aperture and a gap, which enable the detachable interlinking. However, Votel fails to disclose a method for adjusting the distance between the two jaw members to accommodate larger objects which require securing. Additionally, Votel fails to disclose an adjustable locking assembly further comprising an adjustable strap to ensure an object is secured along its length.

Even further, another possible solution to this problem is disclosed in U.S. Pat. No. 4,960,063 (Bontemps). Bontemps discloses a safety device for the foot-holder of a sailboard or the like in which the foot-holder has a strap fixed at one end on the sailboard and another end secured to a latch which can be engaged in a locking body. The latch and locking body are arranged so that under a force exerted on the latch in a certain direction, the latch is unlocked to enlarge the loop while remaining engaged in the locking body. Under a stress exerted on the latch in a second direction, the latch is released from the locking body and opens the loop. However, Bontemps fails to disclose a means of adjusting the distance between the fixed end and the latch end of the strap. Instead, both ends of the strap are secured and only the length of the strap can be adjusted. Additionally, Bontemps fail to disclose a corresponding flexible mount module to further support the object that is locked within the strap. Moreover, Bontemps fails to disclose a locking module which would secure a universal nozzle connector.

Therefore, there is a long-felt need for an apparatus for storing non pre-connected nozzles to increase the speed of mounting and dismounting, while also increasing the storage stability. Further, there is also a long-felt need for a mounting system that will accommodate a pre-connected nozzle at a height level easily reached by a user while standing on the ground and that is arranged to accommodate a variety of nozzle sizes.

SUMMARY

According to aspects illustrated herein, there is provided an adjustable locking assembly, comprising a strap lock including a clamping element, a locking strap including a first end connected to the strap lock and a second end connected to a locking pin, and a pin locking element including a pivoting latch, the pivoting latch including a channel arranged to receive the locking pin, wherein in a locked position, the locking pin is secured in the channel and the pivoting latch is pivoted away from the strap lock, and in an unlocked position, the locking strap is freely movable.

According to aspects illustrated herein, there is provided a mounting assembly for a nozzle, the nozzle comprising an inlet end, a discharge end and a universal connector adapted to connect to the inlet end of the nozzle, the universal connector comprising a hollow cylindrical body having a first end with internal threading, and a second end, an externally threaded cylinder protruding from the second end and a rim circumscribing the hollow cylindrical body between the first end and the second end, the mounting assembly comprising a track, a connector base connected to the track, the connector base including a channel arranged to support the universal connector, an adjustable locking assembly, including a strap lock including a clamping element, a locking strap including a first end connected to the strap lock and a second end connected to a locking pin, and a pin locking element including a pivoting latch, the pivoting latch including a channel arranged to receive the locking pin, wherein in a locked position, the locking pin is secured in the channel and the pivoting latch is pivoted away from the strap lock, and in an unlocked position, the locking strap is freely movable, and a flexible mount assembly connected to the track and arranged to support the discharge end of the nozzle.

The present disclosure comprises a flexible mount assembly adapted to support a discharge end of a nozzle, the flexible mount assembly comprising a first mount comprising a first rear surface and a first front surface, a first arm extending upwardly from the first mount, the first arm comprising a first extended portion extending from the first arm and, a first base extending outwardly from the first front surface adapted to connect to a track and, a second mount comprising a second rear surface and a second front surface, a second arm extending upwardly from the second mount, the second arm comprising a second extended portion extending from the second arm and, a second base extending outwardly from the second front surface adapted to connect to the track, wherein the first rear surface is in contact with the second rear surface.

The present disclosure also comprises a storage mount for a universal connector, comprising a base comprising a curved end, a flexible plank, a tab extending upwardly from the plank arranged to act as a radial barrier to the universal connector, a curved wall extending upwardly from the curved end of the base which partially secures the universal connector concentrically within the curved wall and, wherein the tab is displaced downwardly when the plank is pressed downward to retrieve or insert the universal connector.

The present disclosure also comprises an adjustable locking assembly, comprising a strap lock comprising a clamping element, a locking strap secured to the strap lock, the locking strap comprising a locking pin and, a pin locking element comprising a pivoting latch with a channel, the pivoting latch comprising a locked position, wherein the channel of the pivoting latch is adapted to receive the locking pin at a distance away from the strap lock, and the locking strap is freely movable when the pivoting latch is in a position other than the locked position.

The present disclosure also comprises a universal connector, comprising a hollow cylindrical body having a first end with internal threading, and a second end, an externally threaded cylinder protruding from the second end and, a rim circumscribing the hollow cylindrical body between the first end and the second end.

The present disclosure also comprises a mounting assembly for a nozzle, the nozzle comprising an inlet end, a discharge end and a universal connector adapted to connect to the inlet end of the nozzle, the universal connector comprising a hollow cylindrical body having a first end with internal threading, and a second end, an externally threaded cylinder protruding from the second end and a rim circumscribing the hollow cylindrical body between the first end and the second end, the mounting assembly comprising a track, a connector base comprising an arcuate channel to support the universal connector, the connector module further comprising first and second members that connect to the track along a bottom surface, an adjustable locking assembly comprising a strap lock connected to the first member of the connector base, the strap lock comprising a clamping element, a locking strap comprising a locking pin, the locking strap secured to the strap lock by the clamping element, a pin locking element connected to the second member of the connector base and, a latch pivotally attached to the pin locking element, the latch comprising a channel adapted to receive the locking pin, and a locked position, the locking strap is freely movable when the pivoting latch is in a position other than the locked position and, a flexible mount assembly adapted to support the discharge end of the nozzle, the flex mount module comprising a first mount comprising a first rear surface and a first front surface, a first arm extending upwardly from the first mount, the first arm comprising a first extended portion extending from the first arm and, a first base extending outwardly from the first front surface adapted to connect to a track and, a second mount comprising a second rear surface and a second front surface, a second arm extending upwardly from the second mount, the second arm comprising a second extended portion extending from the second arm and, a second base extending outwardly from the second front surface adapted to connect to the track, wherein the first rear surface is in contact the second rear surface.

A general object of the present disclosure is to provide a mounting point that will be the same for all makes and models of 1.5" diameter nozzles.

Another object of the present disclosure is to provide an efficient and durable locking mount.

A further object of the present disclosure is to provide a locking strap which can be adjusted.

Yet another object of the present disclosure is to provide a mount that can be adjusted for various nozzle diameters and nozzle lengths.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3A is a perspective view of a connector as shown in FIG. 1;

FIG. 3B is a top view of the connector shown in FIG. 3A;

FIG. 3C is a cross-sectional view of the connector taken generally along line 3C-3C in FIG. 3B;

FIG. 6A is a front view of a mount of a flexible mount assembly as shown in FIG. 1;

FIG. 6B is a side view of the mount of flexible mount assembly as shown in FIG. 1;

FIG. 6C is a perspective view of the mount of flexible mount assembly as shown in FIG. 1;

FIG. 6D is a front perspective view of the mount of flexible mount assembly as shown in FIG. 1;

FIG. 6E is a back perspective view of the mount of flexible mount assembly as shown in FIG. 1;

DETAILED DESCRIPTION

Figure 1:
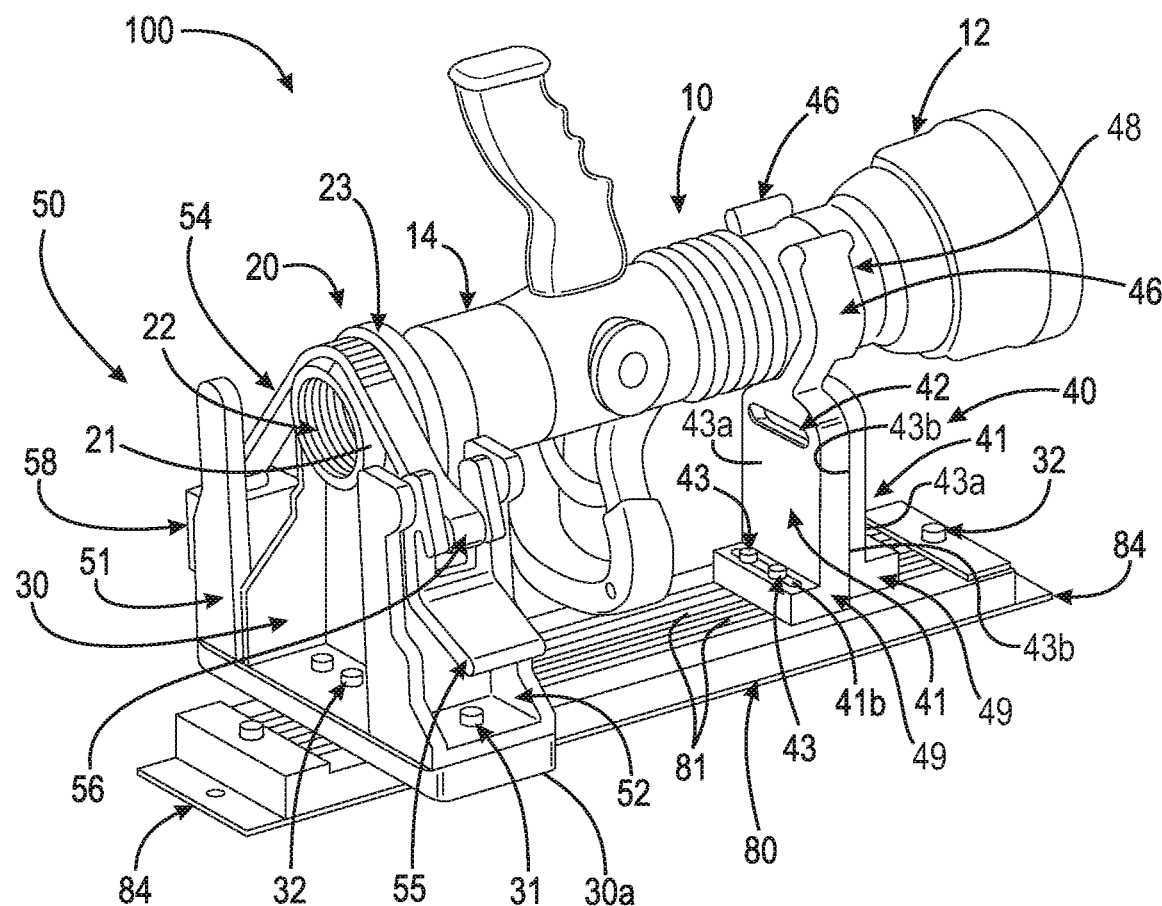
FIG. 1 is a perspective view of an assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Because of the emergency nature of firefighting, the time required to get a hose "on the fire" is of major importance. Consequently, the speed of releasing a pre-connect from a mounting system is of considerable importance. A grab-and-go system, with the fire fighters' feet on the ground, is most desirable. Any pre-connect nozzle mounting system has to accommodate environmental conditions. Therefore, the present mounting system is resistant to weather extremes, e.g., from subzero temperatures to extreme heat and UV exposure. Moreover, the present system is easily adjustable because the length, size and weight of 1.5" diameter nozzles can vary greatly.

Frequently, 200 feet of 1.5" diameter hose is pre-connected between a pump discharge and a 1½ inch nozzle. To store the hose, the pump discharge valve must be closed, the 1½ inch nozzle valve control opened and any water in the hose drained out. The hose is then folded into the hose bed. In many cases, the nozzle is stored with the nozzle control valve in the open position. The handler valves connected to the nozzle are often quite large. Any mounting of these nozzles must recognize space required not only for the nozzle itself, but also for the handle. Some also include a pistol grip that can often be large. The present system accommodates the foregoing constraints.

Further, the pre-connected nozzle may be required to mount vertically attached to the side of the truck or it may be mounted horizontally on the front bumper or other area. Even further, the length, weight and discharge end of the nozzle can vary greatly so it is necessary that there be a cradle mount for the discharge end that can easily be adjusted to provide a secure customized mount for the nozzle. The result is a locking mount for the base swivel end of the nozzle and a friction clamp type mount for the discharge end. A track system is used to easily adjust the length between the two mounts.

Mounting any equipment on a mobile vehicle must recognize the various gravitational forces generated when the truck runs over bumps or holes in the road. To counter-act these forces, the present disclosure supports both the inlet end and the discharge end of the nozzle. The support on the discharge end is easily adjusted to not only a wide range of diameters but also to variances in the distance between the inlet end and discharge end of the nozzles. The current disclosure allows for easy movement and be securely locked into position once a dimension is finalized.

Referring now to the Figures, FIG. 1 shows assembly 100 as an embodiment of the present disclosure. Assembly 100 broadly comprises nozzle 10, universal connector 20, connector base 30, flexible mount assembly 40, locking assembly 50, and track 80. Universal connector 20 attaches to inlet end 14 of nozzle 10. Universal connector 20 is supported by connector base 30 and securely locks into place by locking assembly 50. Further, discharge end 12 of nozzle 10 is supported by flexible mount assembly 40. Flexible mount assembly comprises mounts 41, which are identical to one another, and further comprise arms 46. Arms 46 at least partially circumscribe nozzle 10 and are flexible to accommodate many nozzle diameters of nozzle 10. Mount 41 comprises aperture 41b which allows screws 43 to secure mount 41 to track 80. Since flexible mount assembly 40 is adjustable to accommodate multiple nozzle diameters, screws 43 remove to adjust mounts 41 on track 80 and secure mounts 41 in a new position on track 80. Assembly 100 adjusts as to the length of nozzle 10 due to flexible mount 40 and connector base 30 being attached to track 80, i.e., connector base 30 and flexible mount assembly 40 may move within track 80. Connector base 30 secures to track 80 along surface 30a by screw 32 and adjusts on track 80 to accommodate different nozzle lengths. Locking assembly 50 comprises base 51, base 52, locking strap 54, latch 55, locking pin 56, and strap lock 58. Base 51 and base 52 secure to connector base 30 by screws 31. Strap lock 58 is arranged on base 51 and fixes the length of locking strap 54, which can be adjusted. Locking strap 54 secures universal connector 20 along surface 21 to connector base 30 and is secured in place by latch 55. Latch 55 is rotatably secured to base 52 and is arranged to engage with locking pin 56 of locking strap 54. Track 80 comprises channels 81 which run the length of track 80 and extensions 84 on either side to allow track 80 to be mounted to any surface, such as the body of a fire truck.

Figure 2A:
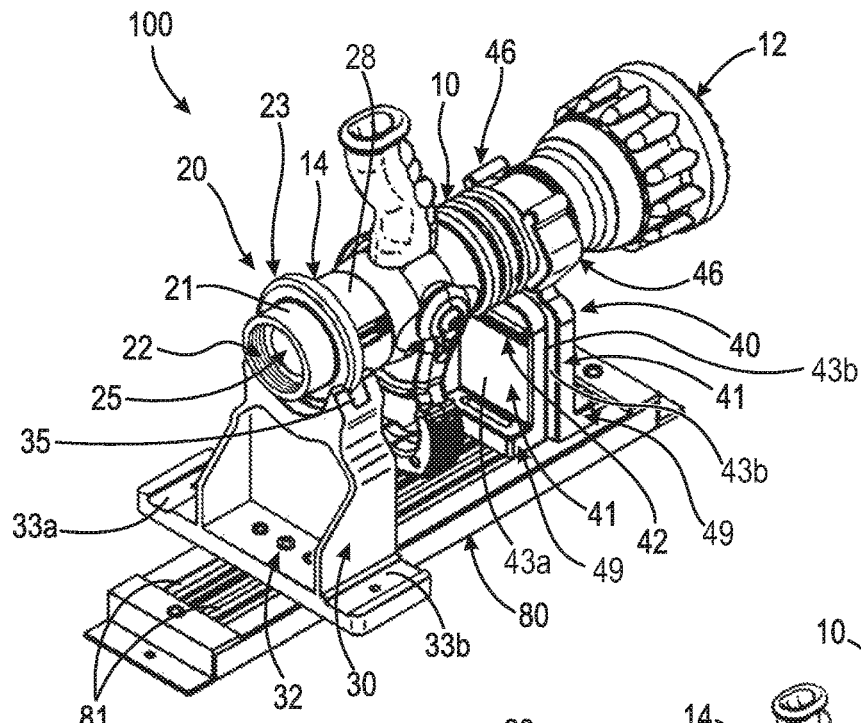
FIG. 2A is a perspective view of the assembly shown in FIG. 1 without a locking module.
Figure 2B:
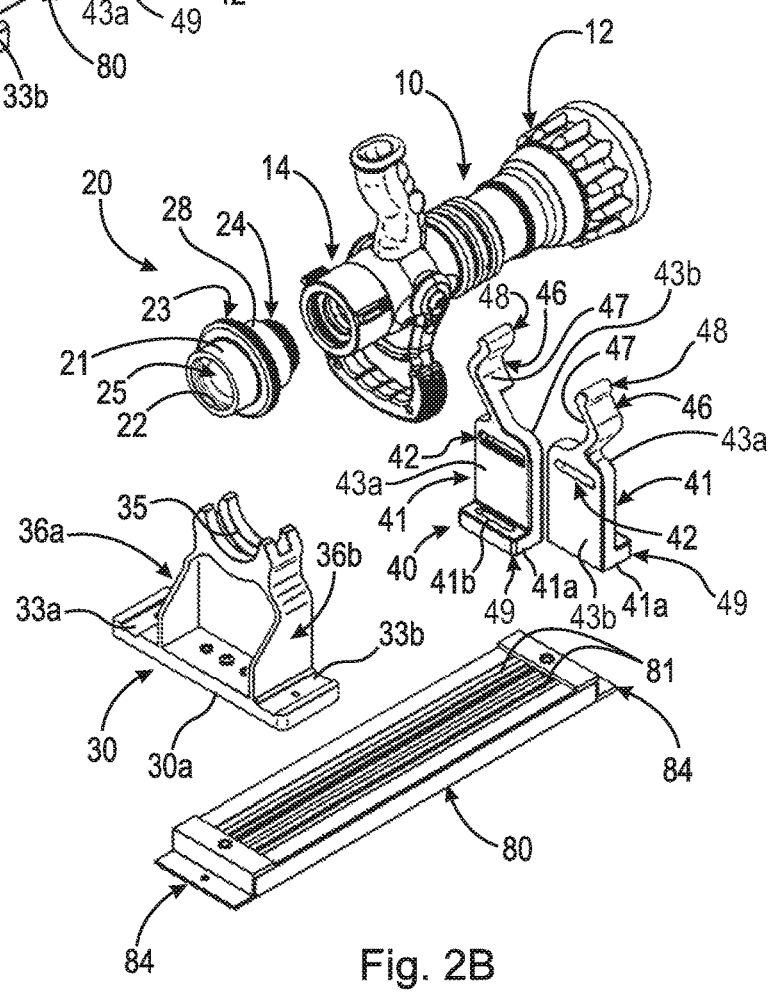
FIG. 2B is an exploded perspective view of the assembly shown in FIG. 1 without locking module.

FIGS. 2A and 2B are a perspective view and an exploded perspective view, respectively, of assembly 100 of the present disclosure without locking module 50. It is shown in the figures that connector base 30 comprises channel 35 which rim 23 of universal connector 20 engages when nozzle 10 is secured within assembly 100. Universal connector 20 comprises external threads 24 on surface 28 which allow universal connector 20 to secure to inlet end 14 of nozzle 10. Additionally, universal connector 20 comprises internal threads 22 within aperture 25. Threads 22 allow a fire hose to be connected to universal connector 20 and aperture 25 allows water or fluid to flow through universal connector 20 into inlet end 14 of nozzle 10. FIG. 2B shows flexible mount assembly 40 is made of two identical mounts 41 facing opposite to one another.

FIGS. 3A, 3B, and 3C are a perspective view, a top view, and a cross-sectional view, respectively, of nozzle connector 20 taken generally along line 3C-3C in FIG. 3B. Nozzle connector 20 allows for a common mounting area for all 1½ inch nozzles. In a preferred embodiment, rim 23 has a coarse knurled texture which helps prevent universal connector 20 from becoming dislodged from channel 35 of base mount 30 (shown in FIG. 2B). Rim 23 can engage connector base 30 via channel 35 (shown in FIG. 2A) for a pre-connected universal connector with nozzle 10, or engage lip 62 and tab 66 (shown in FIG. 4F) on storage mount 60. Rim 23 extends radially outward in a greater amount than both surface 21 and surface 28 in order to secure with channel 35 (shown in FIG. 2A). In order to connect to any nozzle 10 or fire house (not shown), internal threads 22 are arranged within aperture 25 and external threads 24 are arranged on surface 28 of universal connector 20. It should be appreciated, however, that the use of different thread arrangements and securement means is possible and considered to be within the scope of the present disclosure. For example, internal threads 22 could be arranged on surface 21 of universal connector 20 in order to accommodate a new type of fire house connection.

The 1.5" diameter swivel on every nozzle is substantially similar; therefore the present mounting system is related to this connection. A 1.5" diameter internal threading 22 and a 1.5" diameter external threading 24 of connector 20 are installed between and join the discharge end of the 1.5" diameter hose and the 1.5" diameter swivel inlet of a nozzle thereby providing a common dimensional structure for mounting all nozzles. Universal connector 20 may be anodized with NFPA recognized colors thereby serving to identify the 1.5" diameter discharge valve at a pump panel with a particular pre-connected line.

Further, universal connector 20 enables the nozzle to be mounted on a firefighter's hip with a hip holster. A hip mounted holster provides efficient movement in and out in order to relieve strain on a fire fighter's arms while pulling or using the discharge from the nozzle on the fire. Nozzle reaction forces on a 1.5" diameter nozzle discharging 150 GMP at 100 PSI are intense, often requiring two men to handle the hose and nozzle. By transferring reaction forces from arms to the hip greatly reduces fatigue. Likewise, dragging a 1.5" diameter line filled with water is extremely tiresome for the firefighter.

Figure 4A:
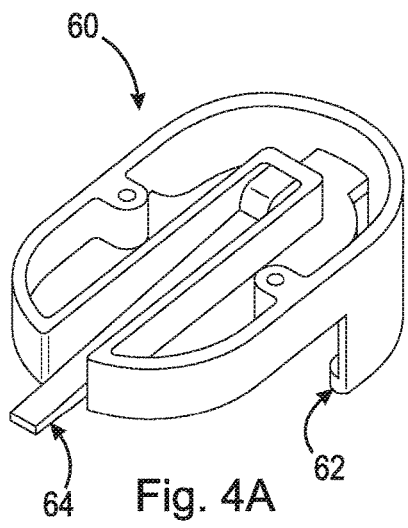
FIG. 4A is a bottom perspective view of a storage mount.
Figure 4B:
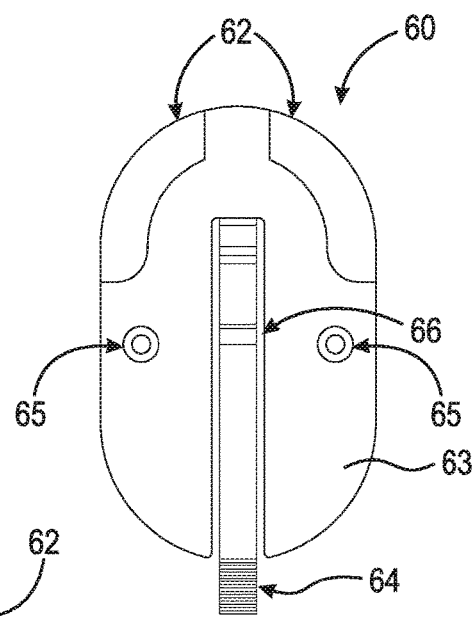
FIG. 4B is a top view of the storage mount shown in FIG. 4A.
Figure 4C:
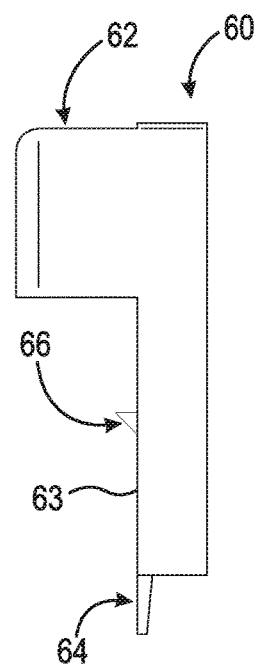
FIG. 4C is a side view of the storage mount shown in FIG. 4A.
Figure 4D:
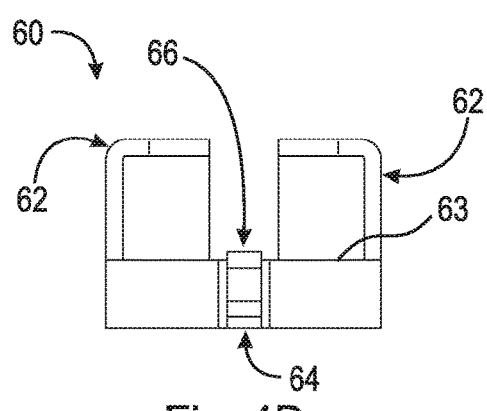
FIG. 4D is a front view of the storage mount shown in FIG. 4A.
Figure 4E:
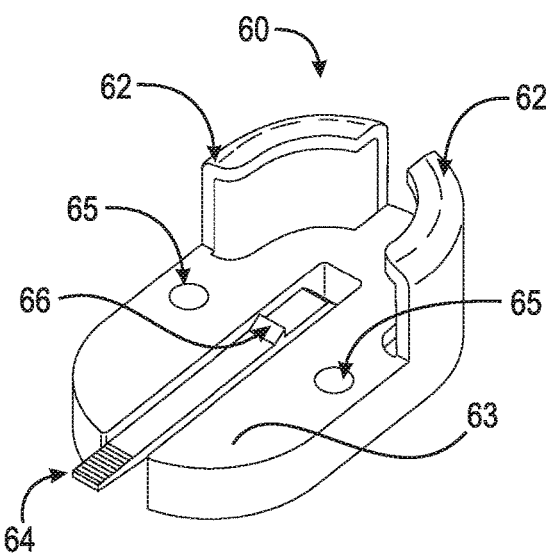
FIG. 4E is a top perspective view of the storage mount shown in FIG. 4A.
Figure 4F:
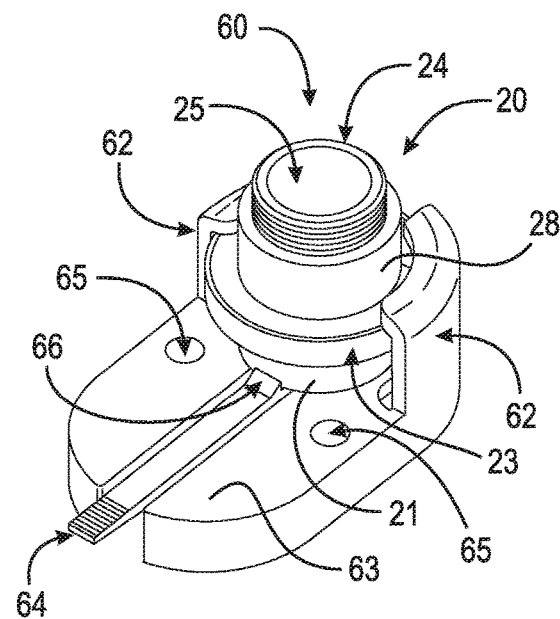
FIG. 4F is a top perspective view of the storage mount shown in FIG. 4A with connector.
Figure 5A:
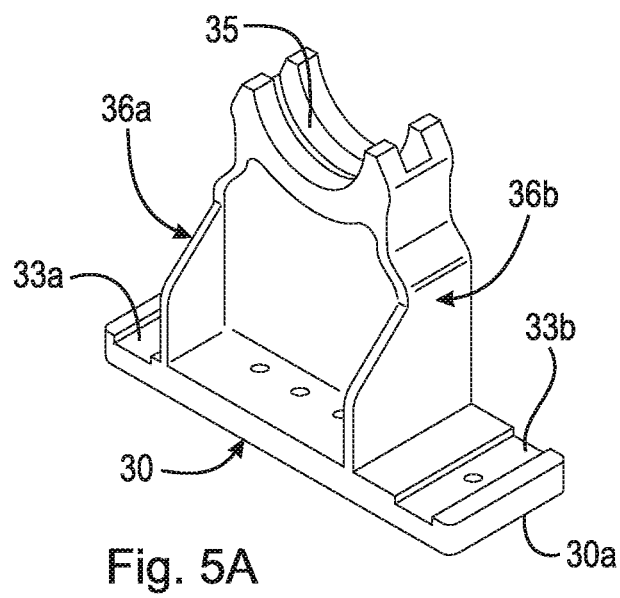
FIG. 5A is a perspective view of a base mount as shown in FIG. 1.
Figure 5B:
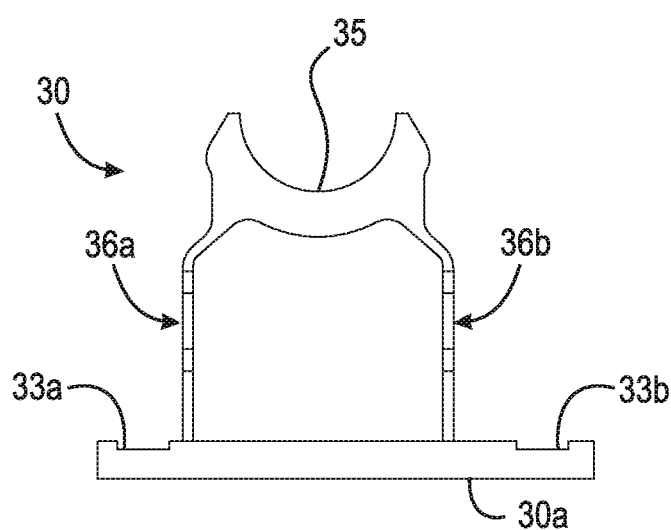
FIG. 5B is a front view of the base mount shown in FIG. 5A.
Figure 5C:
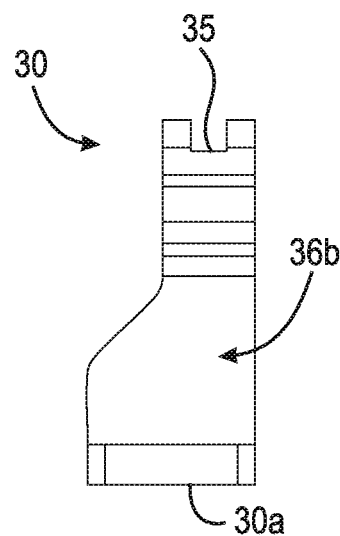
FIG. 5C is a side view of the base mount shown in FIG. 5A.
Figure 5D:
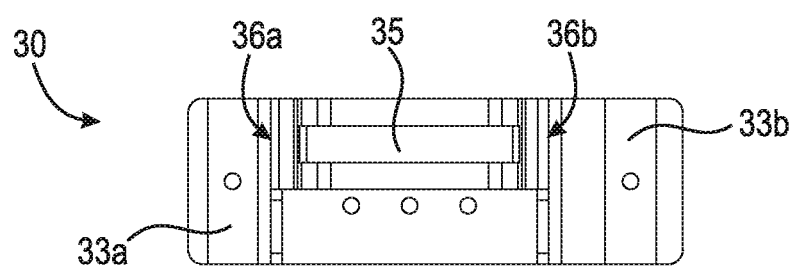
FIG. 5D is a top view of the base mount shown in FIG. 5A.

FIGS. 4A, 4B, 4C, 4D, and 4E are a bottom perspective view, top view, side view, front view, and top perspective view of storage mount 60, respectively. Storage mount 60 has plank 64 comprising tab 66. Tab 66 abuts connector 20 to secure connector 20 sturdily in place by prohibiting radial movement. Further, plank 64 is flexible for easy attachment and detachment of connector 20 simply by pushing on the tip of plank 64, which displaces tab 66 downward thereby freeing radial movement of connector 20. FIG. 4F shows universal connector 20 secured within storage mount 60. Lip 62 extends inwardly to interact with rim 23 and surface 28 of universal connector 20 in order to prohibit axial movement. Storage mount 60 comprises apertures 65 which allow storage mount 60 to be mounted to track 80 (shown in FIG. 2B) or on a surface such as the body of a fire truck (not shown).

FIGS. 5A, 5B, 5C, and 5D are a perspective view, front view, side view, and top view, respectively, of connector base 30. In a preferred embodiment, channel 35 is arcuate in shape and aligns with rim 23 of universal connector 20. It should be appreciated, however, that the use of different shapes of channel 35 is possible and considered to be within the scope of the present disclosure. Universal connector 20 rests on member 36a and member 36b while rim 23 of universal connector 20 sits within channel 35 for added stability. Connector base 30 has surface 30a that interacts with track 80 (shown in FIG. 1), and mounting channels 33a and 33b to secure base 51 and base 52 of locking assembly 50.

FIGS. 6A, 6B, 6C, 6D, and 6E are a front view, side view, perspective view, front perspective view, and back perspective view, respectively, of mount 41 of flexible mount assembly 40. As shown in the figures, mount 41 comprises aperture 42, surface 43a, surface 43b, arm 46, and base 49. Aperture 42 allows for a screw (not shown) or some securement means to secure two identical mounts 41 facing opposite one another on track 80 (shown in FIG. 1). Surface 41a of base 49 connects mount 41 to track 80 so it can be adjusted to the desired distance along the track. The combination of two arms 46 engaging along surface 43b forms a full cradle along surfaces 47. Arm 46 is designed to be flexible to allow ease of disengagement of nozzle 10 from flexible mount assembly 40 (shown in FIG. 1). Nozzle 10 can be snapped into place simply by pushing nozzle 10 through the space between the tips of each arm 46. Further, the slotted base of mount 41 and the mating surfaces of arms 46 permit the gap between arms 46 to be adjusted. This adjustability enables arms 46 to accommodate larger or smaller diameter articles to be supported. In a preferred embodiment, arm 46 is integral to mount 41. It should be appreciated, however, that the use of different shapes and materials for arm 46 is possible and considered to be within the scope of the present disclosure. For example, arm 46 could be made from a plastic which deforms with less force when compared to the material which mount 41 is manufactured from to make disengagement easier. Additionally, arm 46 could be designed with a hinge or slide means to keep nozzle 10 secured within assembly 100. Arm 46 has extended portion 48, which creates a thin portion of arm 46 and a thick portion of arm 46. This allows the thickness of flexible mount assembly 40 as a whole to be consistent when mounts 41 are situated facing oppositely along track 80. In this way, the thin portion of the curved arms creates a uniform thickness for the portion supporting nozzle 10 because the thin portions of each arm 46 contact the thin portion of the other arm 46.

Figure 7A:
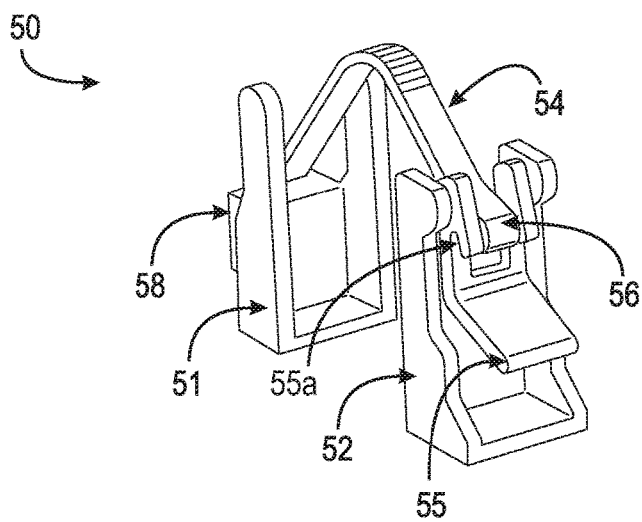
FIG. 7A is a perspective view of a locking assembly as shown in FIG. 1.
Figure 7B:
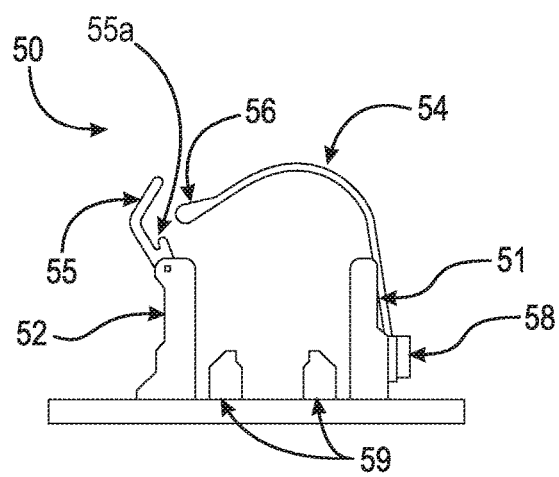
FIG. 7B is a side view of the locking assembly shown in FIG. 7A in an unlocked position.
Figure 7C:
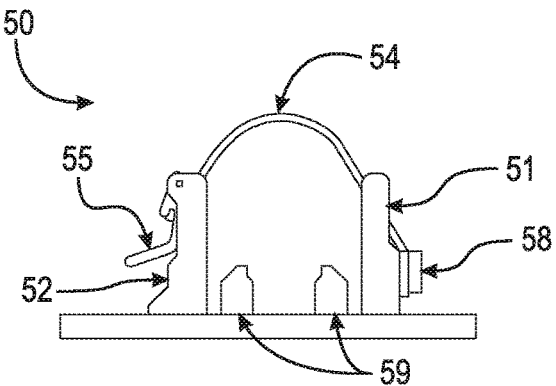
FIG. 7C is a side view of the locking assembly shown in FIG. 7A in a locked position.

FIGS. 7A, 7B, and 7C are a perspective view, a side view of locking assembly 50 in an unlocked position, and a side view of locking assembly 50 in a locked position, respectively. Locking assembly 50 comprises mount 51, mount 52, locking strap 54, latch 55, locking pin 56, and strap lock 58. Locking strap 54 traverses a space from mount 51 to mount 52. One end of locking strap 54 is clamped to strap lock 58 with the other end having locking pin 56 engaging latch 55. Mount 52 has latch 55 which can either release locking strap 54 or secure it in place. Locking pin 56 is threaded through an aperture in locking strap 54 and secured within channel 55a of latch 55 when latch 55 is in an upright position. FIG. 7B shows latch 55 in the upright position. When locking strap 54 is secured within channel 55a of latch 55 and fixed to the desired length by using strap lock 58, pushing latch 55 downwards about its pivotable connection on mount 52 locks strap 54 in place. In a preferred embodiment, strap 54 comprises ridges on the top surface to ensure stability. It should be appreciated, however, that the use of different stability means for locking strap 54 are possible and considered to be within the scope of the present disclosure. For example, locking strap 54 could comprise apertures symmetrically arranged along the length of locking strap 54. The apertures could then be engaged by a screw arranged within strap lock 58. For further stability, i.e., for cylinders, supports 59 are optionally provided and secure to track 80 (shown in FIG. 9A).

Figure 8A:
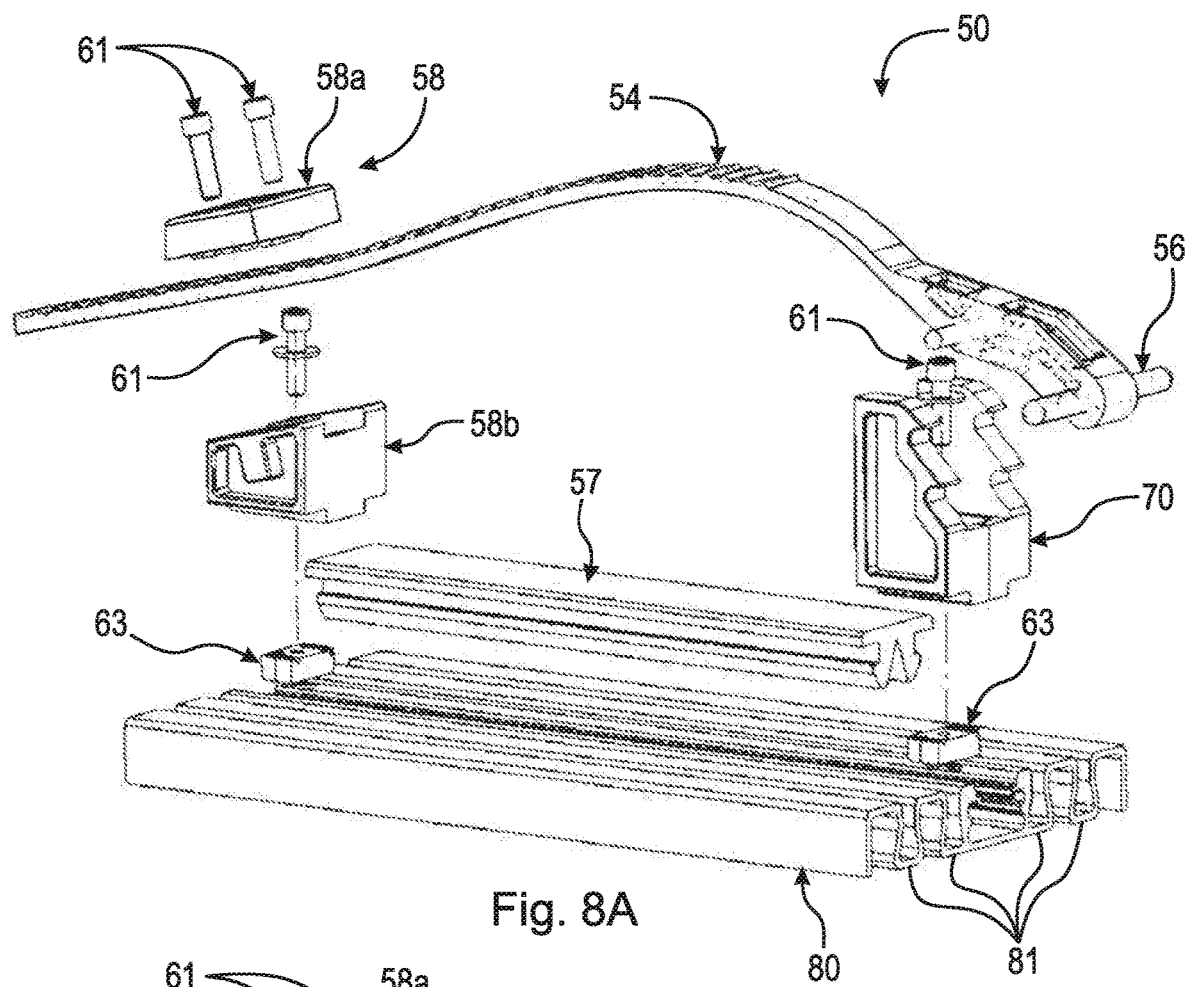
FIG. 8A is an exploded perspective view of a secondary embodiment of a locking assembly.
Figure 8B:
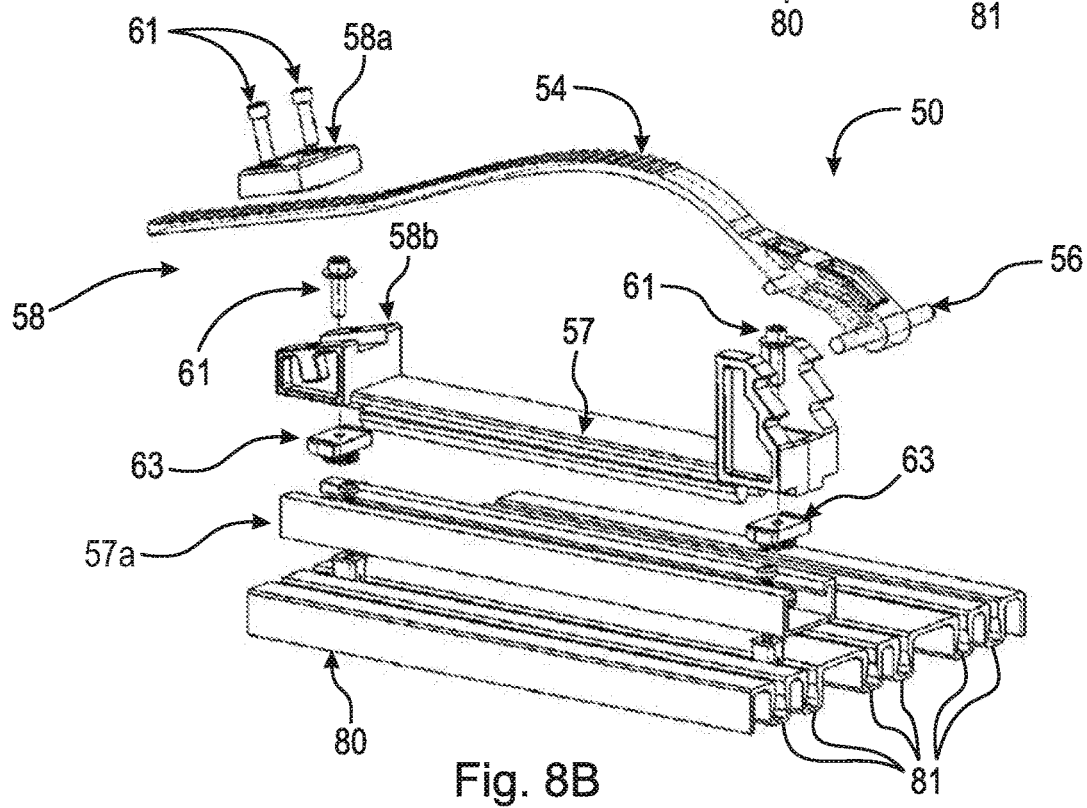
FIG. 8B is an exploded perspective view of the locking assembly shown in FIG. 8A.

FIG. 8A and FIG. 8B are exploded perspective views of a secondary embodiment of locking assembly 50 without mount 51 and mount 52. Pin locking element 70 engages with locking pin 56 of locking strap 54 via channels. Strap lock 58 comprises clamping element 58a and base 58b. Clamping element 58a and base 58 are secured to one another via screws 61 and fix the length of locking strap 54. Locking strap 54 can be smooth and elastic, smooth and rigid, ridged and elastic, or ridged and rigid. Locking assembly 50 can be attached to the adjustable mounting assembly 100 with spacing between strap lock 58 and pin locking element 70 dictated by connector base 30 (shown in FIG. 1). Alternatively, the spacing between strap lock 58 and pin locking element 70 can be maintained by arranging insert 57 within channels 81 of track 80 as shown in FIGS. 8A and 8B. Strap lock 58 is secured in channel 81 of track 80 via screw 61 and bushing 63. Additionally, and pin locking element 70 is secured in channels 81 of track 80 via screw 61 and bushing 63. If it is desired that strap lock 58 and pin locking element 70 be positioned above track 80, guide 57a can be secured to track 80 via screws 61 and bushings 63.

Figure 9A:
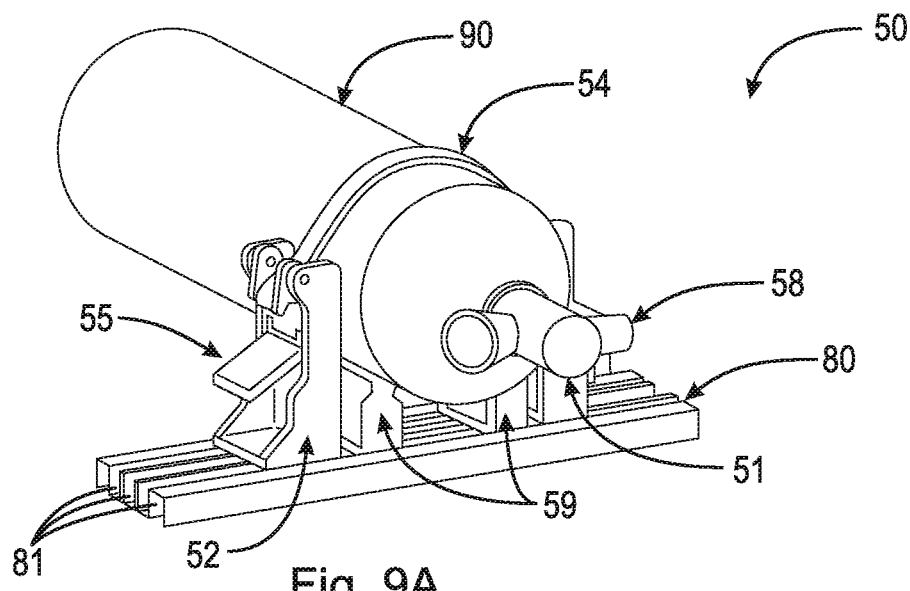
FIG. 9A is a perspective view of the locking assembly shown in FIG. 7A securing a large canister.
Figure 9B:
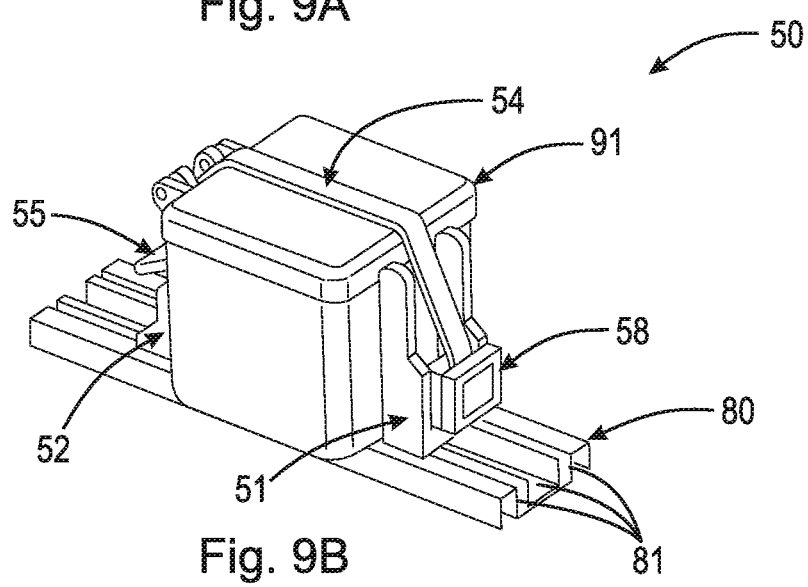
FIG. 9B is a perspective view of the locking assembly shown in FIG. 7A securing a crate; and, FIG. 9C is a perspective view of the locking assembly shown in FIG. 7A securing a small canister.
Figure 9C:
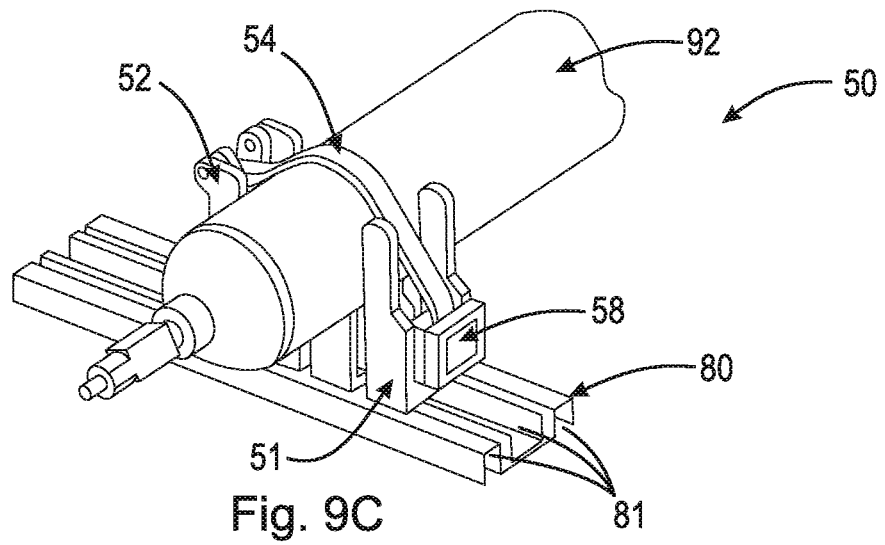

FIGS. 9A, 9B, and 9C are perspective views of locking assembly 50 demonstrating its capability of locking various objects to track 80. As shown in the figures, locking assembly 50 can lock large canister 90, crate 91, and small canister 92 to track 80 for transportation or storage. It is important to note that supports 59 are only required for large canister 90 and small canister 92 due to the arcuate outer surface of each canister. Similar to nozzle 10 (shown in FIG. 1), locking assembly can be secured to track 80 at any position along its length, such that multiple locking assemblies 50 can be secured within the same channels 81 of track 80.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

10 Nozzle
12 Discharge end
14 Inlet end
20 Universal connector
21 Surface
22 Internal threads
23 Rim
24 External threads
25 Aperture
28 Surface
30 Connector base
30a Surface
32 Screw
33a Channel
33b Channel
35 Channel
36a Member
36b Member
40 Flexible mount assembly
41 Mount
41a Surface
41b Aperture
42 Aperture
43 Screws
43a Front surface
43b Rear surface
46 Arm
47 Surface
48 Extended portion
49 Base
50 Locking assembly
51 Mount
52 Mount
54 Locking strap
55 Latch
55a Channel
56 Locking pin
57 Insert
57a Guide 58 Strap lock
58a Clamping element
58b Base
59 Support
60 Storage mount
61 Screws
62 Lip
63 Bushing
64 Plank
65 Aperture
66 Tab
70 Locking element
80 Track
81 Channels
84 Extension
90 Large canister
91 Crate
92 Small canister
100 Assembly

What is claimed is:

1. An adjustable locking assembly, comprising:
a track;
a first mount and a second mount, the second mount being spaced apart from the first mount, the first and second mounts being non-pivotable with respect to each other, wherein the first and second mounts are adjustably secured to the track;
a connector base arranged proximate the first and second mounts, the connector base including a first channel and a second channel, the first mount secured in the first channel and the second mount secured in the second channel;
a strap lock connected to the first mount and including a clamping element;
a locking strap including a first end connected to the strap lock and a second end fixedly secured to a locking pin; and,
a pin locking element connected to the second mount and including a pivoting latch, the pivoting latch including a channel arranged to receive the locking pin;
wherein:
in a locked position, the locking pin is secured in the channel and the pivoting latch is pivoted away from the strap lock; and,
in an unlocked position, the locking strap is freely movable.

2. The adjustable locking assembly as recited in claim 1, further comprising a pair of supports between the strap lock and the pin locking element.

3. The adjustable locking assembly as recited in claim 1, wherein the locking strap further comprises one or more ridges.

4. The adjustable locking assembly as recited in claim 3, wherein the one or more ridges on the locking strap engage with the strap lock.

5. The adjustable locking assembly as recited in claim 1, wherein the length of the locking strap is adjustable.

6. The adjustable locking assembly as recited in claim 1, wherein the locking strap engages with a universal connector.

7. The adjustable locking assembly as recited in claim 1, wherein the connector base is connected to the track along a bottom surface of the connector base.

8. The adjustable locking assembly as recited in claim 1, wherein the connector base comprises an arcuate channel arranged to support a universal connector.

9. The adjustable locking assembly as recited in claim 1, further comprising a flexible mount assembly connected to the track.

10. The adjustable locking assembly as recited in claim 1, wherein the clamping element secures the locking strap via one or more screws.

11. A mounting assembly for a nozzle, the nozzle comprising an inlet end, a discharge end and a universal connector adapted to connect to the inlet end of the nozzle, the universal connector comprising a hollow cylindrical body having a first end with internal threading, and a second end, an externally threaded cylinder protruding from the second end and a rim circumscribing the hollow cylindrical body between the first end and the second end, the mounting assembly comprising:
a track;
a connector base connected to the track, the connector base including a channel arranged to support the universal connector;
an adjustable locking assembly, including:
a strap lock including a clamping element;
a locking strap including a first end connected to the strap lock and a second end fixedly secured to a locking pin, the first end operatively arranged to be slidable with respect to the strap lock and fixedly secured thereto by the clamping element; and,
a pin locking element including a pivoting latch, the pivoting latch including a channel arranged to receive the locking pin, wherein the locking pin is operatively arranged to be completely disengageable from the pivoting latch;
wherein:
in a locked position, the locking pin is secured in the channel and the pivoting latch is pivoted away from the strap lock; and,
in an unlocked position, the locking strap is freely movable; and,
a flexible mount assembly connected to the track and arranged to support the discharge end of the nozzle, wherein the flexible mount assembly and the connector base are displaceable on the track independently of each other.

12. The mounting assembly as recited in claim 11, wherein the locking strap is arranged to secure the universal connector to the connector base.

13. The mounting assembly as recited in claim 11, wherein the flexible mount assembly comprises:
a first mount, including:
a first body having a first rear surface and a first front surface;
a first arm extending upwardly from the first body, wherein the first arm is apertureless; and,
a first base extending substantially perpendicular from the first front surface and adapted to connect to the track, wherein the first base comprises at least one first aperture; and,
a second mount comprising:
a second body including a second rear surface and a second front surface;
a second arm extending upwardly from the second body, wherein the second arm is apertureless and not directly connected to the first arm; and,
a second base extending substantially perpendicular from the second front surface and adapted to connect to the track, wherein the second base comprises at least one second aperture, and the first rear surface is in contact with the second rear surface;

wherein the first mount and the second mount are displaceable in a first direction and a second direction, opposite the first direction, to adjust a distance between the first and second arms.

14. The mounting assembly as recited in claim 13, wherein the first arm and the second arm form a cradle to support a discharge end of a nozzle.

15. The mounting assembly as recited in claim 13, wherein the first arm and the second arm are flexible members.

* * * * *